(12) United States Patent
Bisaccioni (10) Patent No.: US 12,507,687 B2
(45) Date of Patent: Dec. 30, 2025

(54) DISPENSER OF PARASITICIDAL SUBSTANCES

(71) Applicant: MOSKYP S.R.L., Rimini (IT)

(72) Inventor: Andrea Bisaccioni, Rimini (IT)

(73) Assignee: MOSKYP S.R.L., Rimini (IT)

( * ) Notice: Subject to any disclaimer, the term of this patent is extended or adjusted under 35 U.S.C. 154(b) by 205 days.

(21) Appl. No.: 18/547,379

(22) PCT Filed: Mar. 9, 2022

(86) PCT No.: PCT/IT2022/050047
§ 371 (c)(1),
(2) Date: Aug. 22, 2023

(87) PCT Pub. No.: WO2022/190152
PCT Pub. Date: Sep. 15, 2022

(65) Prior Publication Data
US 2024/0130345 A1 Apr. 25, 2024
US 2024/0224971 A9 Jul. 11, 2024

(30) Foreign Application Priority Data

Mar. 9, 2021 (IT) .................. 102021000005414

(51) Int. Cl.
*A01M 1/20* (2006.01)
(52) U.S. Cl.
CPC .................. *A01M 1/2061* (2013.01)
(58) Field of Classification Search
CPC .... A01M 1/20; A01M 1/2022; A01M 1/2027; A01M 1/2038; A01M 1/2044; A01M 1/205; A01M 1/2055; B05B 12/081; B05B 12/10; B05B 12/12
See application file for complete search history.

(56) References Cited

U.S. PATENT DOCUMENTS 3,917,168 A * 11/1975 Tenney .................. B05B 7/162
239/138
4,171,070 A * 10/1979 Colgate ................. B05B 7/2445
239/323
7,149,417 B2 * 12/2006 Joshi .................... A01M 1/2072
392/390

(Continued)

FOREIGN PATENT DOCUMENTS

CN 1933722 A 3/2007
CN 207721034 U 8/2018

(Continued)

OTHER PUBLICATIONS

Chinese Office Action dated Apr. 9, 2025 from counterpart Chinese App No. 202280020033.5.

(Continued)

*Primary Examiner* — Paul R Durand
*Assistant Examiner* — Randall A Gruby
(74) *Attorney, Agent, or Firm* — SHUTTLEWORTH & INGERSOLL, PLC; Timothy J. Klima (57) ABSTRACT

A dispenser of parasiticidal substances comprises at least one tank containing a parasiticidal substance, leading to an ejection device for expelling the parasiticidal substance, suitable for being filled with parasiticidal substance and for emitting it as a result of an increase in the temperature.

6 Claims, 11 Drawing Sheets

(56) References Cited

U.S. PATENT DOCUMENTS

| | | | |
|---|---|---|---|
| 8,074,640 B2* | 12/2011 | Davies | A61L 9/145 239/34 |
| 8,636,910 B2* | 1/2014 | Irvin, Sr. | C02F 1/005 210/780 |
| 2007/0023541 A1* | 2/2007 | Brown | A61L 9/127 239/34 |
| 2007/0210101 A1* | 9/2007 | Hammond | A61L 9/12 222/3 |
| 2023/0104389 A1* | 4/2023 | Kim | F16F 1/028 222/207 |

FOREIGN PATENT DOCUMENTS

| | | |
|---|---|---|
| CN | 108566940 A | 9/2018 |
| CN | 108671256 A | 10/2018 |
| CN | 111195569 A | 5/2020 |
| DE | 2915157 A1 | 10/1980 |
| GB | 744547 A | 2/1956 |
| IT | 201800007678 A1 | 1/2020 |
| JP | H0650478 A | 2/1994 |
| KR | 19990086956 A | 12/1999 |
| RU | 2560305 C2 | 8/2015 |
| SU | 495062 A1 | 12/1975 |
| WO | 1999049904 A1 | 10/1999 |

OTHER PUBLICATIONS

Russian Office Action dated Jun. 2, 2025 from counterpart Russian App No. 2023125465.
International Search Report and Written Opinion dated Jul. 18, 2022 from counterpart International Patent Application No. PCT/IT2022/050047.

* cited by examiner

DISPENSER OF PARASITICIDAL SUBSTANCES

This application is the National Phase of International Application PCT/IT2022/050047 filed Mar. 9, 2022 which designated the U.S.

This application claims priority to Italian Patent Application No. 102021000005414 filed Mar. 9, 2021, which applications are incorporated by reference herein.

TECHNICAL FIELD

This invention relates to a dispenser of parasiticidal substances.

It is included in the sector of devices used for combating mosquitoes and other harmful insects, having a dual action: as an adulticide (against adult insects) and a larvicide (against larvae, in particular of mosquitoes), and therefore being both repressive and preventive.

Disinfestation of open environments (even urban ones) is necessary both for comfort, because sometimes the presence of such insects makes the use of parks, gardens and outdoor spaces impossible, and for health and hygiene reasons.

In particular, the need to perform massive and periodic disinfestations or similar treatments increased in Europe towards the early 2000s when the presence of mosquitoes arriving from South-East Asia, the so-called "tiger mosquitoes", became constant. In fact, such mosquitoes are more dangerous than the common type because they are also active in the daytime, are very aggressive and are vectors of pathogenic agents which can transmit allergies or more serious diseases, such as encephalitis or even malaria.

Due to the health and hygiene aspects involved, the problem of combating mosquitoes has become the responsibility of public authorities, which constantly seek effective and efficient systems to put into practice and to suggest to citizens.

BACKGROUND ART

The main aspects to be considered when assessing the most suitable tools for combating mosquitoes, in addition to effectiveness, may be identified as the need to periodically intervene with cyclical treatments, the inexpensiveness of solutions adopted and the limitation of the environmental impact of such solutions.

A common feature of the different types of existing parasiticidal treatments is that they must be carried out cyclically, because the problem of mosquitoes appearing recurs on a seasonal basis, and they must be repeated multiple times during each seasonal cycle, since weather events, such as heavy rain, may compromise their effectiveness. That leads to a substantially continuous use over time of operators dedicated to this activity, and consequently a quite high cost to be borne by the public authorities.

A further problematic aspect of combating mosquitoes is the environmental impact, since both private citizens and specialised companies often use substances which are harmful to the environment and to human health, which are partly "dispersed" in the environment in a way that is not well targeted and not effective.

DISCLOSURE OF THE INVENTION

The aim of this invention is therefore to eliminate the above-mentioned disadvantages.

This invention fits into that context and aims to solve the problem of combating mosquitoes in urban environments, where the main places for development of such insects are drains and large storm drains.

The invention, characterised as set out in the claims, achieves the aim thanks to a device activated by temperature changes.

The main advantage obtained by means of this invention basically consists of the fact that the emission of parasiticidal substances occurs without operator intervention and in a targeted way in the places where the concentration of larvae is assumed to be the greatest.

Moreover, in order to extend the effectiveness of the invention it is sufficient to periodically top up, in any case every few months, the parasiticidal substance.

Consequently, it is possible to achieve considerable savings and minimising of the environmental impact that the parasiticidal substances could have on the environment and on people.

BRIEF DESCRIPTION OF THE DRAWINGS

Further advantages and features of the invention will be more apparent in the detailed description which follows, with reference to the accompanying drawings, which show an example, non-limiting embodiment, in which.

PREFERRED EMBODIMENTS OF THE INVENTION

As can be seen from the figures, the invention relates to a dispenser of parasiticidal substances.

It can be made in various ways, depending on the parasiticidal substance used and on its features, such as, for example, its expandability as a result of temperature changes or the fact that it is liquid or solid: in any case, operation of the dispenser 10 is always caused by an increase in the temperature.

Figure 11:
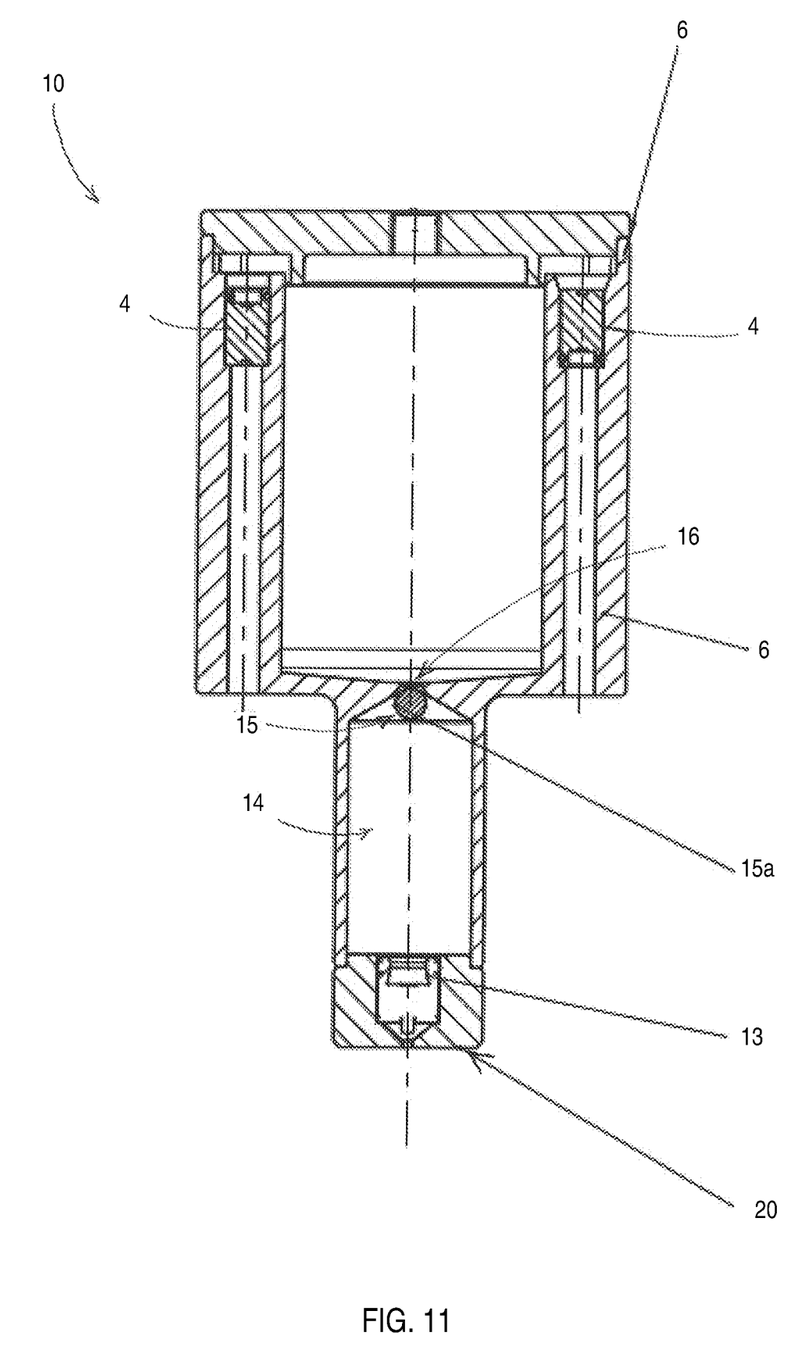
FIG. 11 illustrates a basic version of the invention in a longitudinal section.

A first embodiment, implementable if the parasiticidal substance is significantly expandable, is shown in FIG. 11.

This embodiment involves the use of a tank 6, containing a parasiticidal substance (preferably liquid, but which could even be in a solid or gaseous state), leading to an ejection device 20 for expelling the parasiticidal substance, operated by expansion of the parasiticidal substance resulting from an increase in the temperature. Since the parasiticidal substance is subject to modification of its volume due to temperature changes, it is these which cause operation of the dispenser 10.

As seen in FIG. 11, in this case the ejection device 20 comprises a compression chamber 14, communicating with the tank 6 by means of an opening 16 and provided with occlusion means 15 for closing that opening 16, at a lower end 14a of which there is a non-return valve 13 from which the parasiticidal substance is expelled.

The compression chamber 14 is gradually filled by gravity with the parasiticidal substance through the opening 16 which connects the tank 6 and the compression chamber 14; when the compression chamber 14 is full, the occlusion means 15, which in the example shown are in the form of a small ball 15a with lower density than that of the parasiticidal substance, block the opening 16 interrupting the transit of the parasiticidal substance. In this situation, when there is an increase in the temperature, the volume of the parasiticidal substance increases and part of it is expelled from the non-return valve 13; then when the temperature decreases and the parasiticidal substance occupies less space, the small ball 15a disengages from the opening 16 allowing the compression chamber 14 to fill up again.

FIG. 11 also shows two control valves 4 which are oriented in opposite directions, which put the tank 6 in communication with the outside so as to prevent the creation of negative pressures inside it and to keep it isolated if it is immersed in water.

If the parasiticidal substance is not significantly expandable, it is necessary to provide the dispenser 10 with a second tank 2, placed upstream of the tank 6 containing the parasiticidal substance, which contains a substance suitable for supplying a propelling action as a result of an increase in the temperature.

In this case, shown in FIGS. 1 to 10, the dispenser 10 comprises a second tank 2 containing an expandable fluid, provided with a lower hole 21, a rigid piston 3 slidable inside the hole 21, a spring 9 suitable for opposing the descent of the piston 3 caused by the expansion of the fluid and for aiding its return ascent when the volume of the fluid is reduced, and the tank 6 containing a parasiticidal substance, leading to an ejection device 20 for expelling the parasiticidal substance, operated by the movement of the piston 3. Since the fluid is subject to modification of its volume due to temperature changes, it is these which in this case too cause operation of the dispenser 10.

Figure 1:
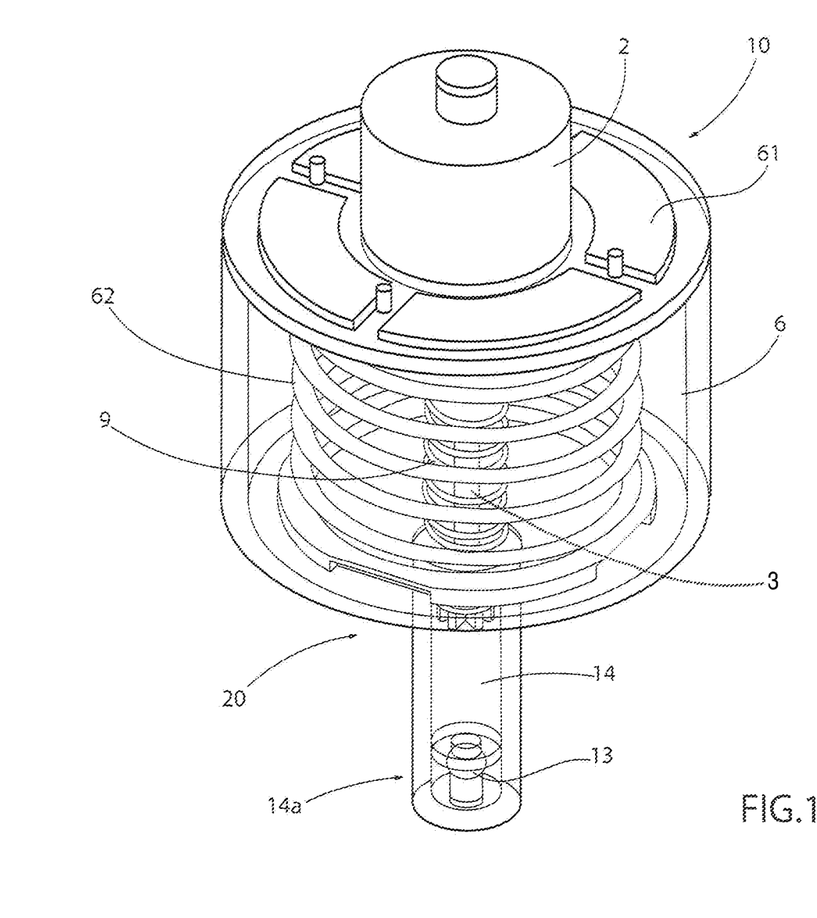
FIG. 1 illustrates a first embodiment of the invention according to a perspective assembly view.
Figure 2:
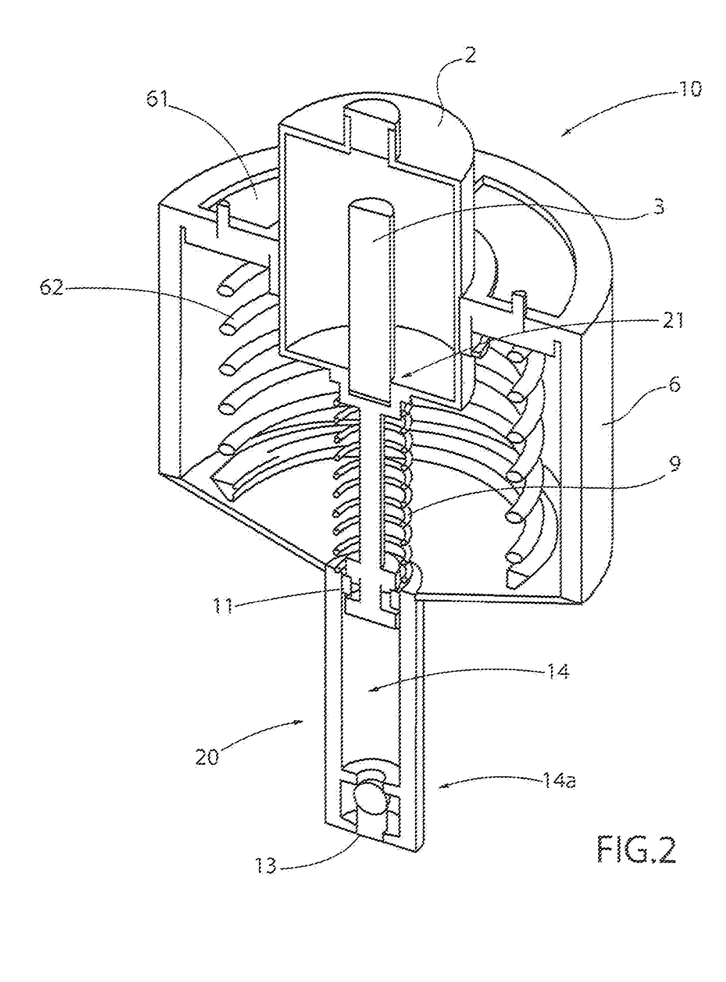
FIG. 2 illustrates the invention of FIG. 1 according to a longitudinal section perspective view.
Figure 3:
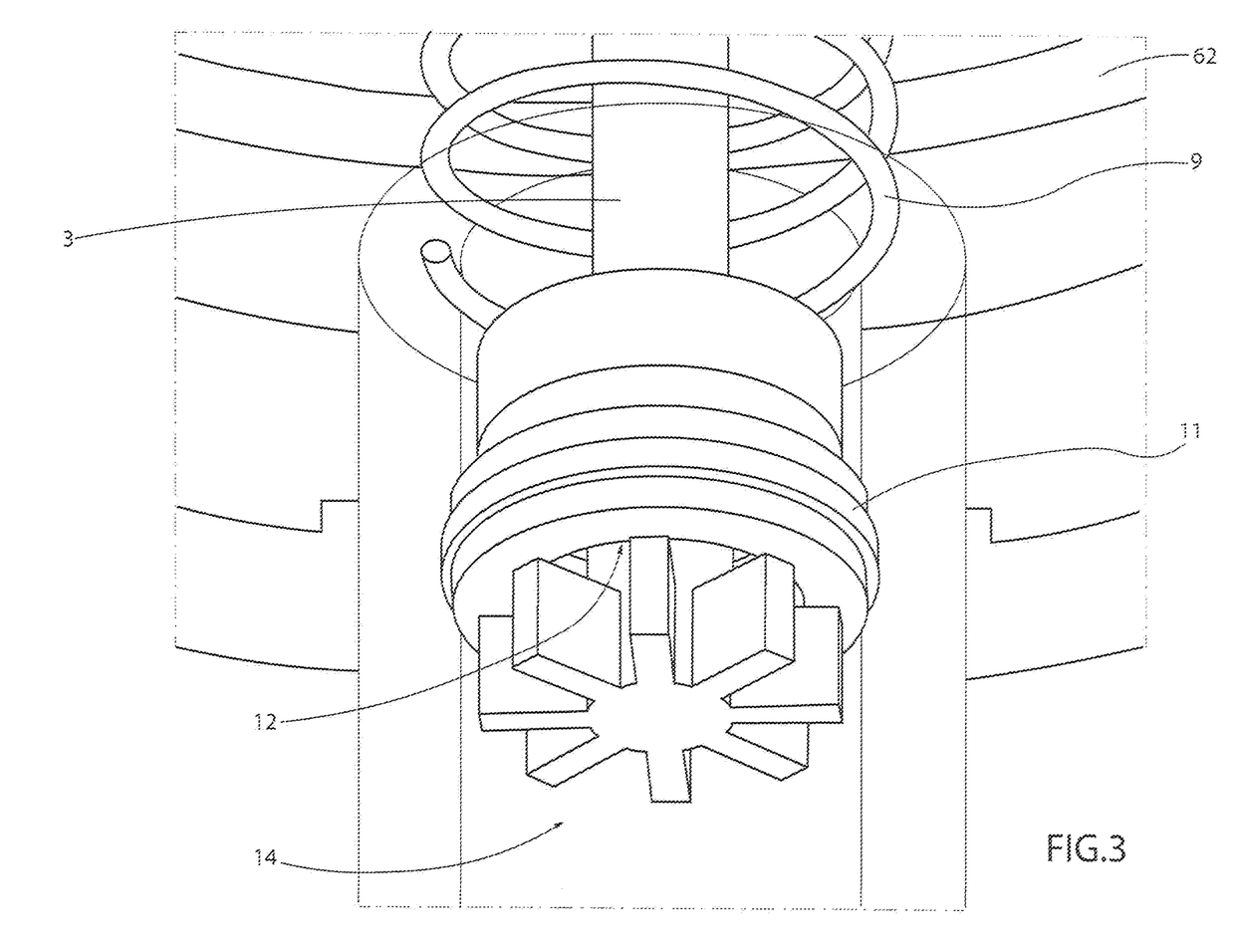
FIG. 3 illustrates a detail of the invention in an operating condition.
Figure 4:
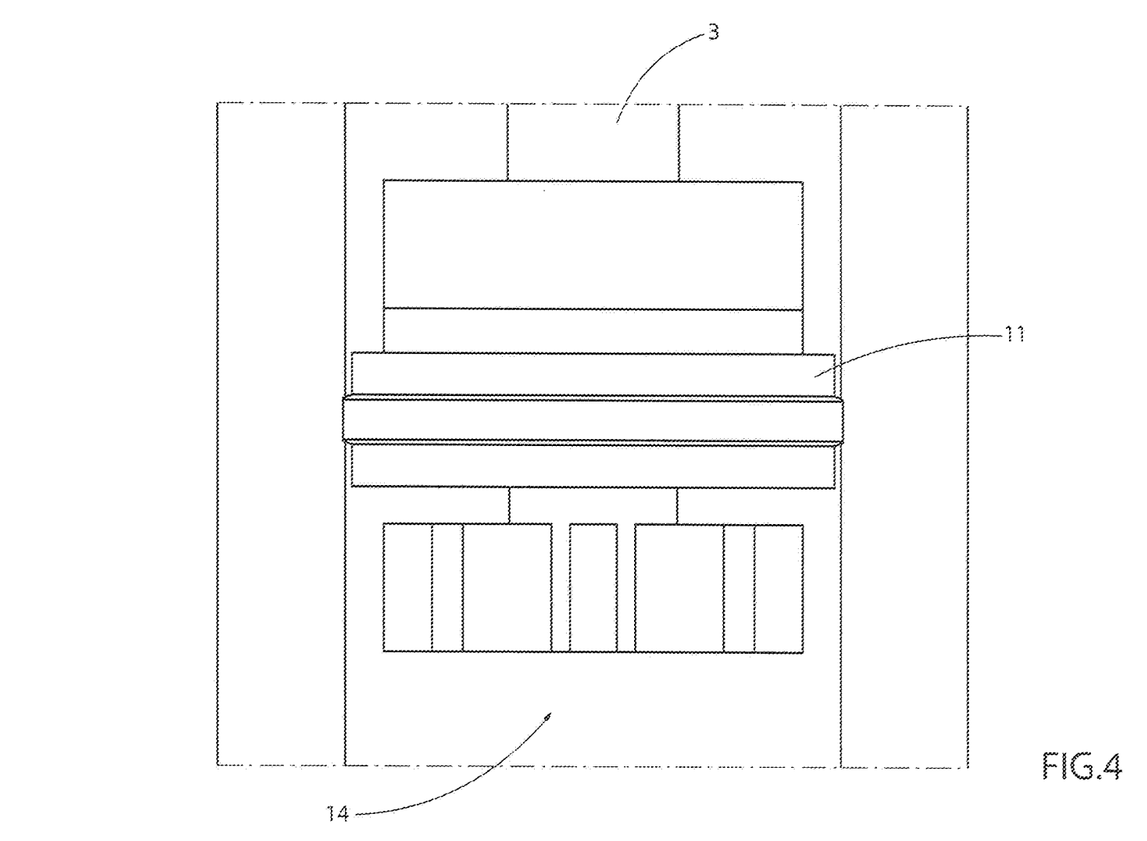
FIGS. 4 to 6 illustrate the detail of FIG. 3 according to an operating sequence.
Figure 5:
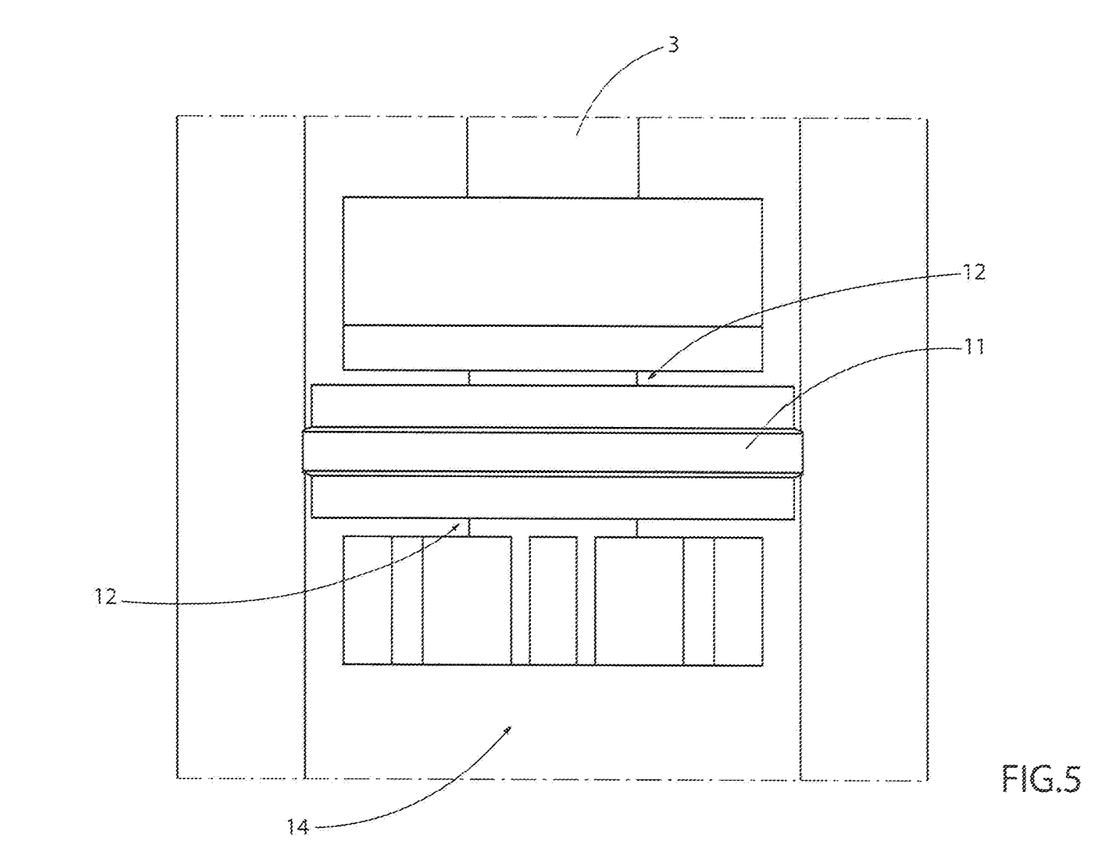
Figure 6:
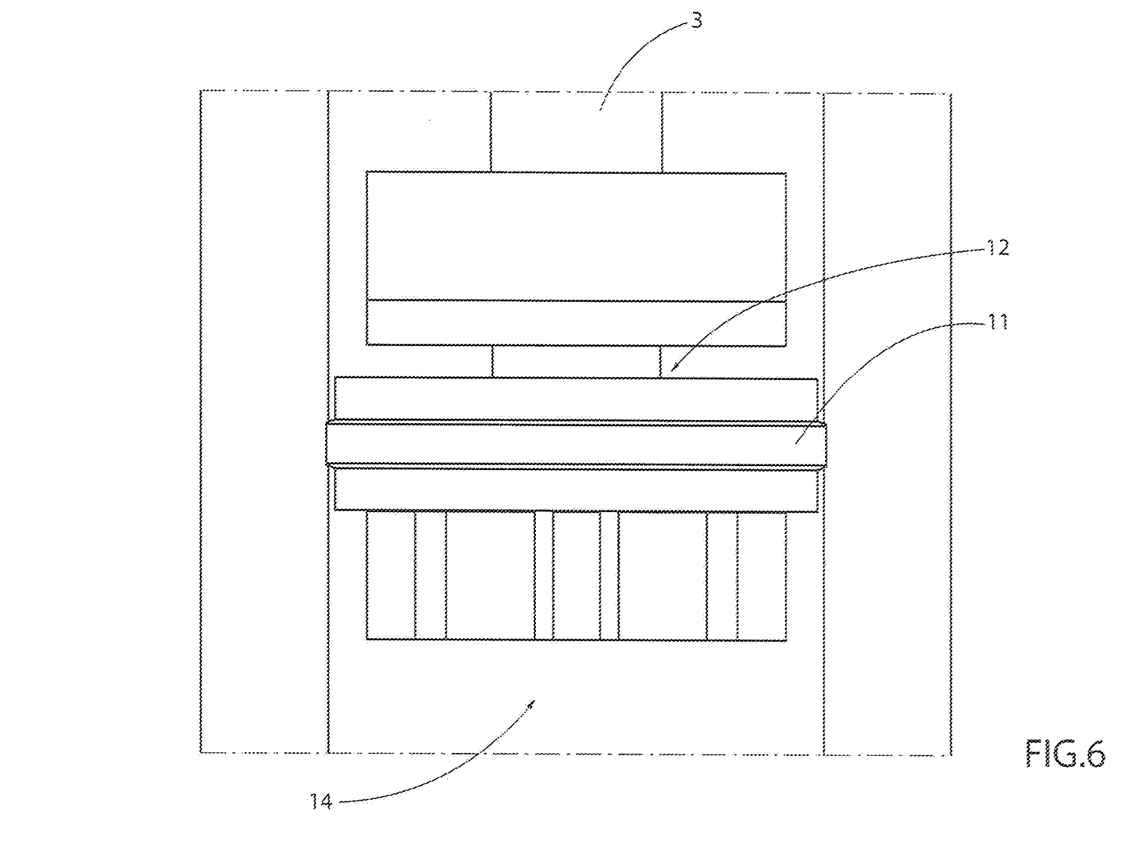
Figure 7:
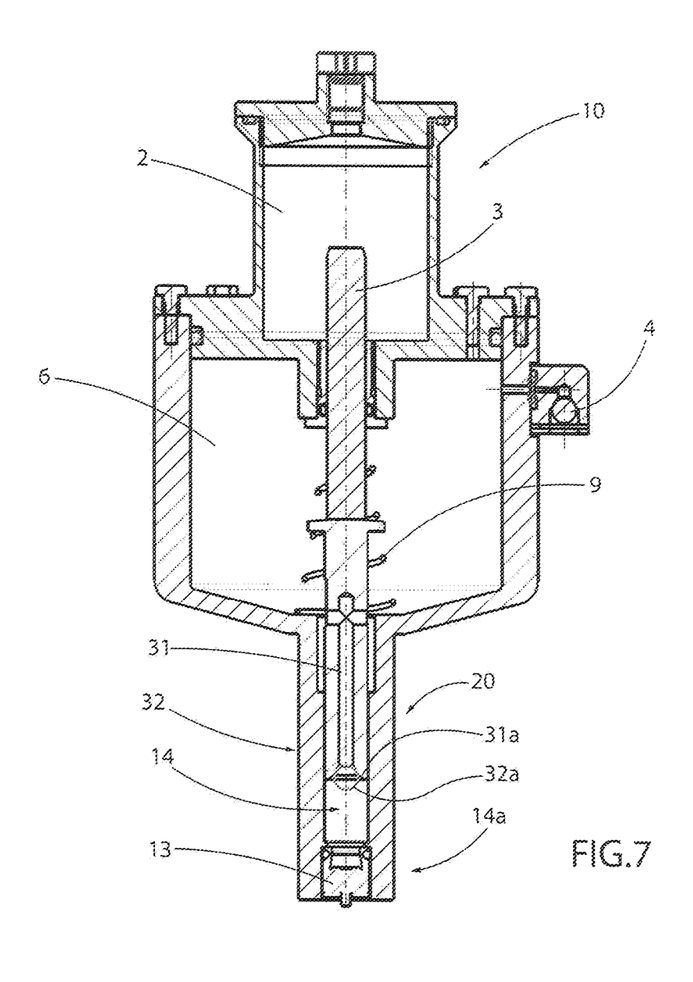
FIGS. 7 and 8 illustrate an alternative version of a detail of the invention in a longitudinal section.
Figure 8:
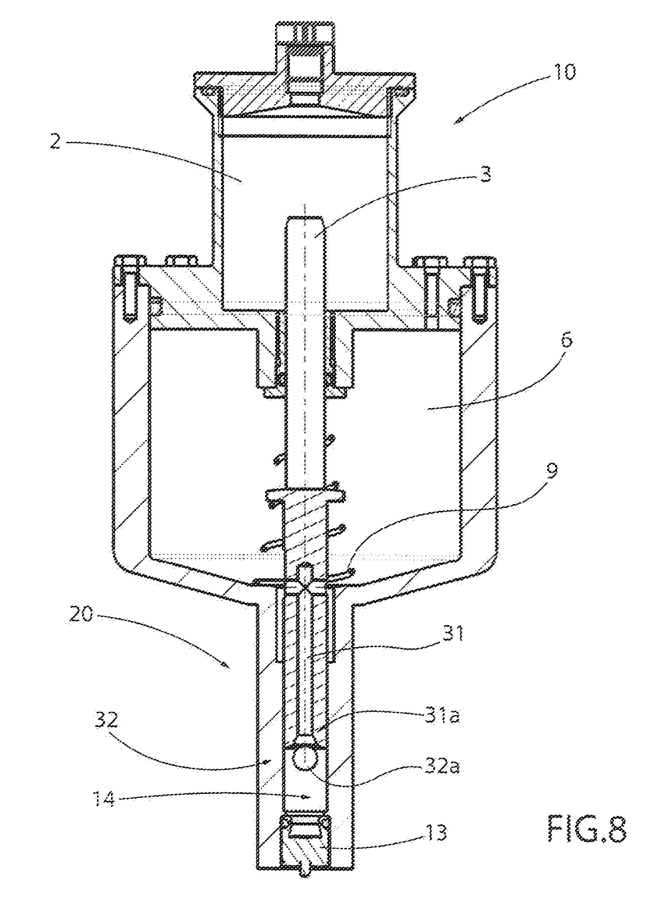
Figure 9:
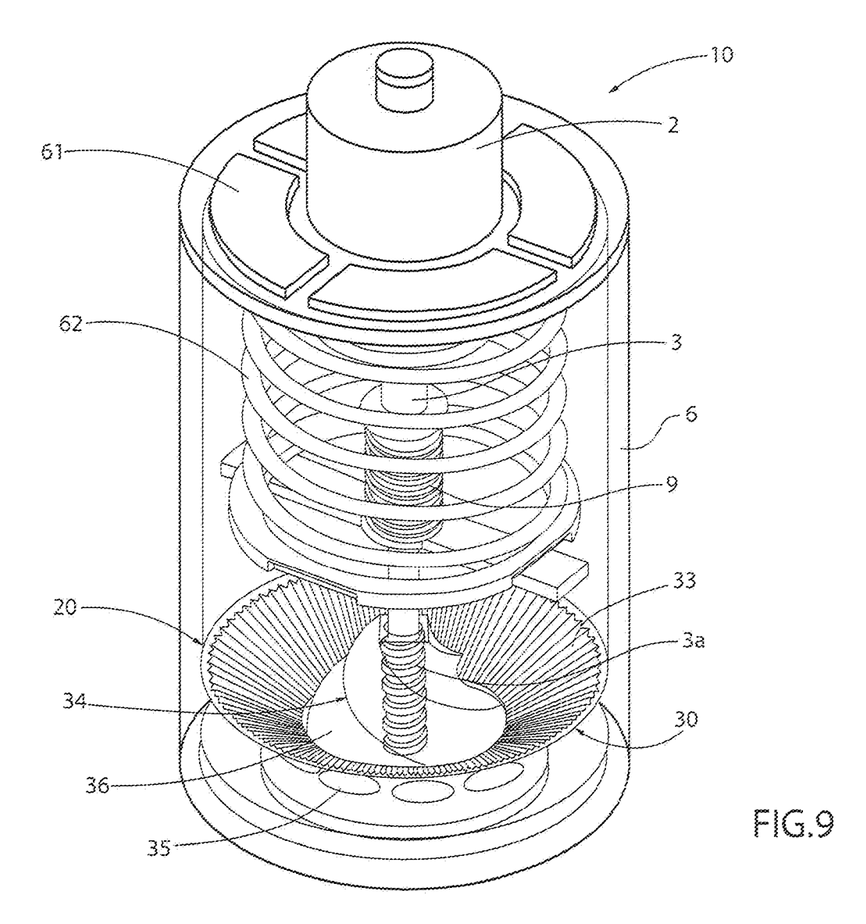
FIGS. 9 and 10 illustrate a second embodiment of the invention, respectively according to a perspective assembly view and according to a longitudinal section perspective view.
Figure 10:
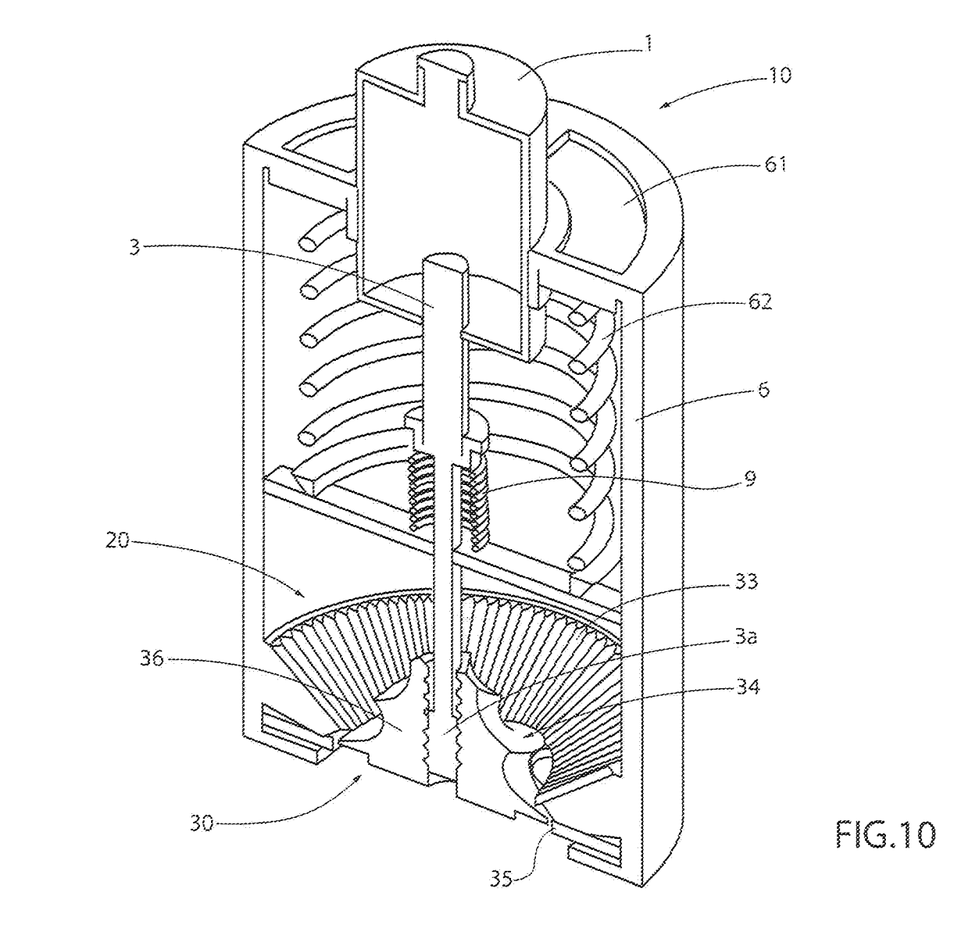

The figures show two different embodiments of the dispenser 10, depending whether the parasiticidal substance is in the liquid state or the solid state: in particular, FIGS. 1 to 8 relate to the first version of the dispenser 10, whilst FIGS. 9 and 10 relate to the second version.

If the tank 6 contains a liquid parasiticidal substance, the ejection device 20 comprises a compression chamber 14 for the parasiticidal substance, at a lower end 14a of which there is a non-return valve 13 from which the liquid is expelled. The sequence shown in FIGS. 3 to 6 shows how, when the volume of the fluid increases as a result of an increase in the temperature, the piston 3 is pushed downwards, moves forward in the compression chamber 14 drawing with it a sealing ring 11, which has a predetermined clearance both in the radial direction and in the axial direction relative to the piston 3, and causes the parasiticidal liquid to be expelled. Then when the temperature starts to fall again, the volume of the fluid is reduced and the piston 3, partly due to the action of the spring 9, ascends again creating a space 12 between itself and the sealing ring 11 which allows the parasiticidal liquid to gradually fill the compression chamber 14, both due to the effect of gravity and the effect of the decompression caused.

Alternatively, as seen in FIGS. 7 and 8, the piston 3 comprises an inner channel 31 for the passage of the parasiticidal liquid and closing means 32 for the channel 31, suitable for preventing the inflow of the parasiticidal liquid into the compression chamber 14 during expelling of the liquid. In the example embodiment shown, the closing means 32 for the channel 31 comprise a ball 32a with lower density than the larvicidal liquid, having dimensions matching the end part of the channel 31 which has the shape of a frustoconical hollow 31a.

If the tank 6 contains a solid parasiticidal substance, the ejection device 20, visible in FIGS. 9 and 10, comprises a pepper mill mechanism 30 formed by a grooved conical ring 33, by a helical surface 34 coaxial with the conical ring 33 and by a pierced grate 35, in such a way as to break up the parasiticidal substance by friction and deposit in on a surface below. In this case, the piston 3 comprises a threaded portion 3a threaded to match a support 36 to which the helical surface 34 is fixed: the longitudinal movement of the piston 3 thereby allows rotation of the helical surface 34 and rubbing of the helical surface 34 against the conical ring 33 causes the break up of the parasiticidal substance.

In all cases, regardless of whether or not the second tank 2 is present, whether or not the parasiticidal substance is in the liquid or solid state, the tank 6 comprises at least one movable portion of wall 61, suitable for shifting to allow topping up of the parasiticidal substance. In the example shown in FIGS. 1 and 9, the movable portion of wall 61 rests on an elastic element 62, in such a way as to yield to the pressure of an operator who performs the topping up and then return to the initial position under the action of the elastic element 62. Even if a second tank 2 is present, it is also appropriate for at least one control valve 4 to be applied to the tank 6 containing the parasiticidal substance, in such a way as to prevent negative pressures inside the latter and to prevent, for example, water from infiltrating inside it.

The invention claimed is:

1. A dispenser of parasiticidal substances, comprising:
   an ejection device;
   at least one tank containing a parasiticidal substance, the at least one tank leading to the ejection device for expelling the parasiticidal substance, the at least one tank suitable for being filled with the parasiticidal substance and for emitting the parasiticidal substance as a result of an increase in a temperature;
   the ejection device comprising a compression chamber, communicating with the at least one tank via an opening which allows passage of the parasiticidal substance, the ejection device including an occlusion device for closing said opening and with a non-return valve located at a lower end, from which the parasiticidal substance is expelled;
   wherein the occlusion device comprises a small ball having a lower density than a density of the parasiticidal substance such that the small ball opens the opening as a result of a decrease in the temperature.

2. The dispenser according to claim 1, and further comprising:
   a second tank containing an expandable fluid, placed upstream of the at least one tank containing the parasiticidal substance and provided with a lower hole, a rigid piston slidable inside the hole, a spring suitable for opposing a descent of the piston caused by the expansion of the fluid and for aiding a return ascent of the piston, such that the ejection device for expelling the parasiticidal substance is operated by the movement of the piston.

3. The dispenser according to claim 2, wherein the piston comprises an inner channel for the passage of the parasiticidal liquid and the occlusion device operates on the inner channel for preventing the inflow of the parasiticidal liquid into the compression chamber during expelling of the liquid.

4. The dispenser according to claim 3, wherein the small ball has dimensions matching a frustoconical hollow made in an end stretch of the inner channel.

5. The dispenser according to claim 2, and further comprising a control valve, applied to the at least one tank, suitable for preventing negative pressures inside said at least one tank.

6. The dispenser according to claim 1, wherein the at least one tank comprises at least one movable portion of wall, suitable for shifting to allow topping up of the parasiticidal substance.

\* \* \* \* \*